US010713145B2

(12) United States Patent
Anaya et al.

(10) Patent No.: US 10,713,145 B2
(45) Date of Patent: Jul. 14, 2020

(54) AUTOMATED DEBUGGING WITH COMBINED STATIC AND DYNAMIC ANALYSIS

(71) Applicant: INTERNATIONAL BUSINESS MACHINES CORPORATION, Armonk, NY (US)

(72) Inventors: Francisco M. Anaya, Hollister, CA (US); John Michael Chase, Newmarket (CA); Yingcong Guan, Richmond Hill (CA); Roger H.E. Pett, Toronto (CA); Trong Truong, Markham (CA); Jian Xu, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/862,864

(22) Filed: Jan. 5, 2018

(65) Prior Publication Data
US 2019/0213107 A1 Jul. 11, 2019

(51) Int. Cl.
*G06F 11/36* (2006.01)
(52) U.S. Cl.
CPC ...... *G06F 11/3624* (2013.01); *G06F 11/3612* (2013.01); *G06F 11/3636* (2013.01); *G06F 11/3664* (2013.01)

(58) Field of Classification Search
CPC .. G06F 11/36; G06F 11/3604; G06F 11/3612; G06F 11/362; G06F 11/3624; G06F 11/3636; G06F 11/3664; G06F 11/3668; G06F 11/3696

USPC ................. 717/124, 127, 129, 131
See application file for complete search history.

(56) References Cited

U.S. PATENT DOCUMENTS

| | | | | |
|---|---|---|---|---|
| 5,778,230 A | * | 7/1998 | Wimble | G06F 11/3664 714/38.13 |
| 6,077,312 A | * | 6/2000 | Bates | G06F 11/362 714/E11.21 |
| 6,249,907 B1 | * | 6/2001 | Carter | G06F 11/3624 714/E11.209 |
| 6,658,625 B1 | * | 12/2003 | Allen | G06F 9/541 715/236 |

(Continued)

OTHER PUBLICATIONS

Chase, Mike, "Pitfalls of Invalid Programs and Data," COBOL Cafe, Jun. 22, 2015, last retrieved from https://www.ibm.com/developerworks/community/blogs/31c890c6-ace1-4eeb-af6b-5950f3a1a5d1/entry/Pitfalls_of_Invalid_Programs_and_Data?lang=en on Jul. 21, 2019. (Year: 2015).*

(Continued)

*Primary Examiner* — Andrew M. Lyons
(74) *Attorney, Agent, or Firm* — Cantor Colburn LLP; Noah Sharkan (57) ABSTRACT

A computer-implemented method includes generating static analysis data by performing static analysis on a program. A breakpoint is set in the program automatically, by a computer processor, based on the static analysis data. The breakpoint is hit during a runtime of the program. A program bug is automatically identified at a context location of the breakpoint when the breakpoint is hit during the runtime of the program. An interactive debugging session of the program is launched automatically at the context location of the breakpoint, based on the identifying the program bug.

17 Claims, 5 Drawing Sheets

(56) References Cited

U.S. PATENT DOCUMENTS

| | | | |
|---|---|---|---|
| 7,275,079 B2* | 9/2007 | Brodsky | G06F 9/541 |
| | | | 709/203 |
| 7,975,257 B2 | 7/2011 | Fanning et al. | |
| 8,578,340 B1* | 11/2013 | Daudel | G06F 9/45504 |
| | | | 710/266 |
| 8,732,673 B2 | 5/2014 | Finking et al. | |
| 8,914,776 B2* | 12/2014 | Rice | G06F 11/3664 |
| | | | 717/124 |
| 8,978,019 B2* | 3/2015 | Trinchini | G06F 8/34 |
| | | | 717/121 |
| 9,471,463 B1 | 10/2016 | Bates et al. | |
| 9,946,631 B1* | 4/2018 | Cook | G06F 11/366 |
| 10,176,077 B2* | 1/2019 | Fan | G06F 11/3624 |
| 2002/0087949 A1* | 7/2002 | Golender | G06F 9/547 |
| | | | 717/124 |
| 2003/0018906 A1* | 1/2003 | Smith | G06F 21/125 |
| | | | 713/189 |
| 2004/0210876 A1* | 10/2004 | Stall | G06F 11/3624 |
| | | | 717/127 |
| 2004/0226003 A1* | 11/2004 | Bates | G06F 11/3648 |
| | | | 717/129 |
| 2005/0172272 A1* | 8/2005 | Bates | G06F 11/362 |
| | | | 717/129 |
| 2008/0127113 A1* | 5/2008 | Wu | G06F 11/3644 |
| | | | 717/129 |
| 2009/0199163 A1* | 8/2009 | Soroker | G06F 8/20 |
| | | | 717/128 |
| 2010/0162217 A1* | 6/2010 | Morrison | G06F 11/3604 |
| | | | 717/129 |
| 2010/0332473 A1* | 12/2010 | Brodsky | G06F 8/75 |
| | | | 707/736 |
| 2011/0271258 A1* | 11/2011 | Park | G06F 8/33 |
| | | | 717/127 |
| 2011/0321017 A1* | 12/2011 | Kapoor | G06F 11/362 |
| | | | 717/129 |
| 2012/0124426 A1* | 5/2012 | Maybee | G06F 11/0757 |
| | | | 714/38.11 |
| 2012/0291017 A1* | 11/2012 | Fuhrer | G06F 11/362 |
| | | | 717/125 |
| 2012/0311550 A1* | 12/2012 | Kawahito | G06F 8/4441 |
| | | | 717/151 |
| 2014/0033180 A1* | 1/2014 | Bates | G06F 11/3636 |
| | | | 717/129 |
| 2014/0189650 A1* | 7/2014 | Gounares | G06F 11/3664 |
| | | | 717/125 |
| 2014/0317608 A1* | 10/2014 | Koju | G06F 8/443 |
| | | | 717/151 |
| 2014/0372988 A1 | 12/2014 | Fanning et al. | |
| 2015/0033205 A1* | 1/2015 | Wintergerst | G06F 11/362 |
| | | | 717/124 |
| 2015/0058824 A1* | 2/2015 | Smiljanic | G06F 11/3636 |
| | | | 717/125 |
| 2015/0199260 A1* | 7/2015 | Deckert | G06F 11/3636 |
| | | | 717/129 |
| 2016/0154726 A1* | 6/2016 | Guan | G06F 11/3636 |
| | | | 717/128 |
| 2016/0328308 A1* | 11/2016 | Pywell | G06F 11/3664 |
| 2017/0039132 A1* | 2/2017 | Bates | G06F 11/3688 |
| 2017/0206153 A1* | 7/2017 | Lan | G06F 11/3664 |
| 2018/0011778 A1* | 1/2018 | Shavro | G06F 11/3676 |

OTHER PUBLICATIONS

IBM Support, "Mustgather: Read first for problems encountered with Debug Tool for z/Os," May 21, 2008, last retrieved from https://www-01.ibm.com/support/docview.wss?uid=swg21254711 on Jul. 21, 2019. (Year: 2008).*

K. Maruyama and M. Terada, "Debugging with reverse watchpoint," Third International Conference on Quality Software, 2003. Proceedings., Dallas, TX, USA, 2003, pp. 116-123. (Year: 2003).*

R. Jakse, "Interactive Runtime Verification—A Ph.D to Improve Bug Detection and Understanding," 2017 IEEE International Symposium on Software Reliability Engineering Workshops (ISSREW), Toulouse, 2017, pp. 124-127. (Year: 2017).*

R. Jakse, Y. Falcone, J. Méhaut and K. Pouget, "Interactive Runtime Verification—When Interactive Debugging Meets Runtime Verification," 2017 IEEE 28th International Symposium on Software Reliability Engineering (ISSRE), Toulouse, 2017, pp. 182-193. (Year: 2017).*

M. Sulír and J. Porubän, "RuntimeSearch: Ctrl+F for a running program," 2017 32nd IEEE/ACM International Conference on Automated Software Engineering (ASE), Urbana, IL, 2017, pp. 388-393. (Year: 2017).*

Chen et al., "Static and Dynamic Analysis in Automated Debugging," https://www.researchgate.net/publication/247641235, p. 1.

Elsaka et al., "Automated Software Debugging Using Hybrid Static/Dynamic Analysis," Dissertation Abstract, 2016, pp. 1-115.

Kaituo Li, "Combining Static and Dynamic Analysis for Bug Detection and Program Understanding," Dissertations and Theses, ScholarWorks@UMassAmherst, May 2014, pp. 1-151.

Pal et al., "Automated Bug Localization of Software Programs: A Survey Report," ACM Transactions on Programming Languages and Systems, vol. V, No. N, Article A, pp. 1-23.

Tschannen et al., "Usable Verification of Object-Oriented Programs by Combining Static and Dynamic Techniques," Springer Link, Apr. 16, 2017, pp. 1-6.

* cited by examiner

AUTOMATED DEBUGGING WITH COMBINED STATIC AND DYNAMIC ANALYSIS

BACKGROUND

The present invention relates to program debugging and, more specifically, to automated debugging with combined static and dynamic analysis.

Debugging is notoriously difficult and can account for up to seventy percent of a program's development effort. Manual debugging, in which a programmer manually examines code, sometimes within an integrated development environment (IDE), can be a time-consuming and frustrating process. To ease the pain of debugging, some automated debugging tools exist.

Static analysis tools, such as BEAM or the lint Unix utility, can scan source code for potential problems. Compiler-generated diagnostic code, such as the COBOL ZONECHECK function, which is specific to International Business Machines® Enterprise COBOL, can be included in a program for debugging the program as it runs. Dynamic analysis tools, such as PurifyPlus, check for common runtime issues, including memory leaks in C and C++ programs, for example. These, among other tools, can assist with the debugging effort.

SUMMARY

Embodiments of the present invention are directed to a computer-implemented method for debugging a program. A non-limiting example of the computer-implemented method includes generating static analysis data by performing static analysis on a program. A breakpoint is set in the program automatically, by a computer processor, based on the static analysis data. The breakpoint is hit during a runtime of the program. A program bug is automatically identified at a context location of the breakpoint when the breakpoint is hit during the runtime of the program. An interactive debugging session of the program is launched automatically at the context location of the breakpoint, based on the identifying the program bug.

Embodiments of the present invention are directed to a system for debugging a program. A non-limiting example of the system includes a memory having computer-readable instructions and one or more processors for executing the computer-readable instructions. The computer-readable instructions include generating static analysis data by performing static analysis on a program. Further according to the computer-readable instructions, a breakpoint is set in the program automatically, based on the static analysis data. The breakpoint is hit during a runtime of the program. A program bug is automatically identified at a context location of the breakpoint when the breakpoint is hit during the runtime of the program. An interactive debugging session of the program is launched automatically at the context location of the breakpoint, based on the identifying the program bug.

Embodiments of the invention are directed to a computer-program product for debugging a program, the computer-program product comprising a computer-readable storage medium having program instructions embodied therewith. The program instructions are executable by a processor to cause the processor to perform a method. A non-limiting example of the method includes generating static analysis data by performing static analysis on a program. Further according to the method, a breakpoint is set in the program automatically, based on the static analysis data. The breakpoint is hit during a runtime of the program. A program bug is automatically identified at a context location of the breakpoint when the breakpoint is hit during the runtime of the program. An interactive debugging session of the program is launched automatically at the context location of the breakpoint, based on the identifying the program bug.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, current debugging tools are lacking in various respects. For instance, tools for performing static analysis of a program do not consider runtime data and, as a result, often report false positives (i.e., reporting a problem where that problem would not exist during runtime). When compiler-generated diagnostic code is included in a program, the result can be a reduction in performance of that program. Lastly, while dynamic analysis can provide useful insights, tools that use dynamic analysis can take unreasonable time to run (e.g., days or weeks) and do not integrate static analysis, and these tools run in isolation and thus do not enable interactive debugging.

Turning now to an overview of the aspects of the invention, one or more embodiments of the invention address the above-described shortcomings of the prior art by combining both static and dynamic analysis with interactive debugging, thus enabling the discovery of insights that might be missed with either static or dynamic analysis alone and further enabling a user to interact with a program as needed for manual debugging. In some embodiments of the invention, to debug a program, static analysis is performed, and that static analysis is used to inform dynamic analysis. When an issue is encountered during a runtime of the program, an interactive debugging session may be automatically initiated or, in some embodiments of the invention, a diagnostic of the issue detected is written to a file for later analysis without interrupting execution of the program.

Figure 1:
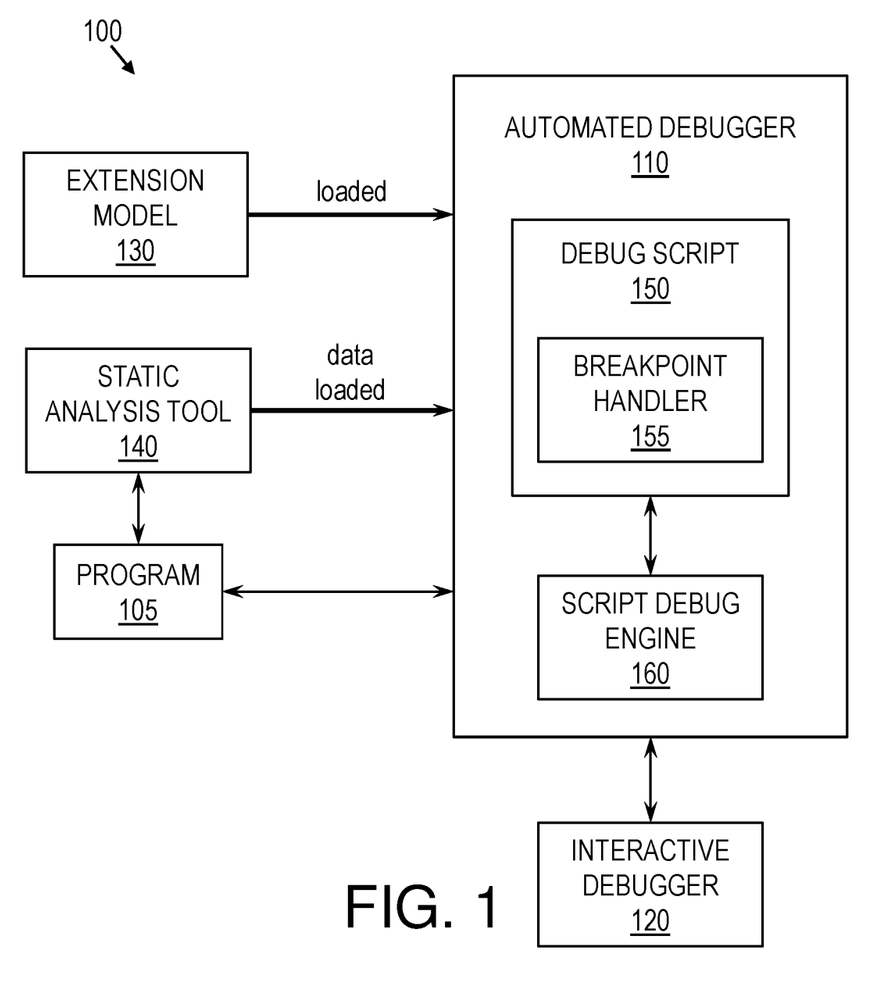
FIG. 1 is a diagram of a debugging system, according to some embodiments of this invention.

Turning now to a more detailed description of aspects of the present invention, FIG. 1 is a diagram of a debugging system 100 for debugging a program 105, according to some embodiments of this invention. The program 105 may be, for example, a standalone program, or it may be part of a larger application. At a high level, a user may initiate the debugging system 100, such as by running a script or an executable. In some embodiments of the invention, the debugging system 100 is incorporated into a headless tool and thus does not have a graphical user interface; however, some embodiments of the invention include a graphical user interface. While running, when the debugging system 100 reaches a breakpoint and identifies a bug, as will be described later, the debugging system 100 may launch an interactive debugger. Thus, from the user's perspective, in some embodiments of the invention, the debugging system 100 is initiated and then runs until it completes with no bugs found, or runs until a bug is found, in which case the interactive debugger is launched automatically.

As shown in FIG. 1, the debugging system 100 may include an automated debugger 110, an interactive debugger 120, an extension model 130, and a static analysis tool 140. In some embodiments of the invention, the automated debugger 110 may be implemented by a debug script 150, which may be executed against a script debug engine 160. Further, the automated debugger 110 may include a breakpoint handler 155, which may be part of the debug script 150. It will be understood by those skilled in the art that a debug program or other component may be used rather than the debug script 150, according to some embodiments of the invention. Each of these components will be described in more detail below. Further, each of these components may include hardware, software, or a combination of both. For instance, each of these may be implemented by a script, program code, a hardware circuit, or a combination of these or other components. It will be understood that the distinction between these components is provided for illustrative purposes only and that these components may be integrated together or further separated based on design decisions.

Figure 2:
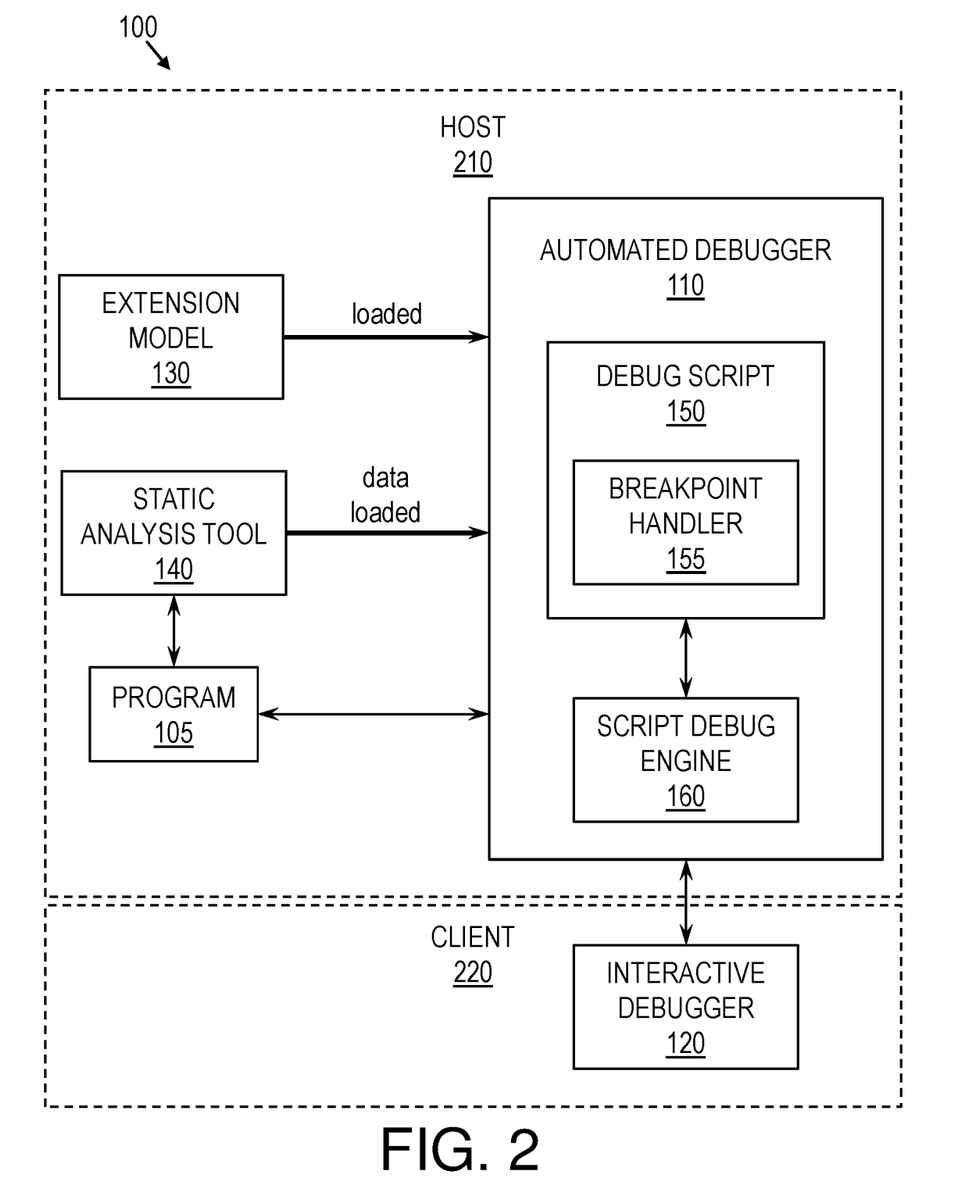
FIG. 2 is another diagram of the debugging system, according to some embodiments of this invention.

FIG. 2 is another diagram of the debugging system 100 for debugging the program 105, according to some embodiments of this invention. As shown in FIG. 2, the automated debugger 110 and the interactive debugger 120 may reside and run on different machines. For instance, the automated debugger 110 may run on a host 210, and the interactive debugger 120 may run on a client 220, which may be remote from the host 210. In that case, the automated debugger 110 may be in remote communication with the interactive debugger 120 when the interactive debugger 120 is needed.

In some embodiments of the invention, the automated debugger 110 may be implemented, at least in part, through the debug script 150. The debug script 150 may include the following or similar, which will be described in more detail below:

// This global variable is a map from source location to variable
global loc2vmap = { }
// Load the extension model
loadExtensionModel("extmodel.xml")
// Load static analysis data
loadDataFile("staticData.xml")
// Information derived from static analysis (SA)
// SA info: Get all variables from the current context -continued

```
variables = vars( )
for v in variables :
    # If a variable's type is "zoned decimal".
    // SA info:
    if v.type = "zoned decimal" :
        # The extension model allows the "references" operation on
a variable, which returns a list of source locations
        // SA info:
        locations = v.references
        for loc in locations :
            # Only do zone check for a sender reference
            // SA info:
            if (loc.isSender):
                # Store the location to variable mapping for later usage
in the breakpoint handler
                loc2vmap[loc] = v
                bp = setLineBreakpoint(loc)
                bp.setBreakpointHandler(new
                MyBreakpointHandler( ))
```

Figure 3:
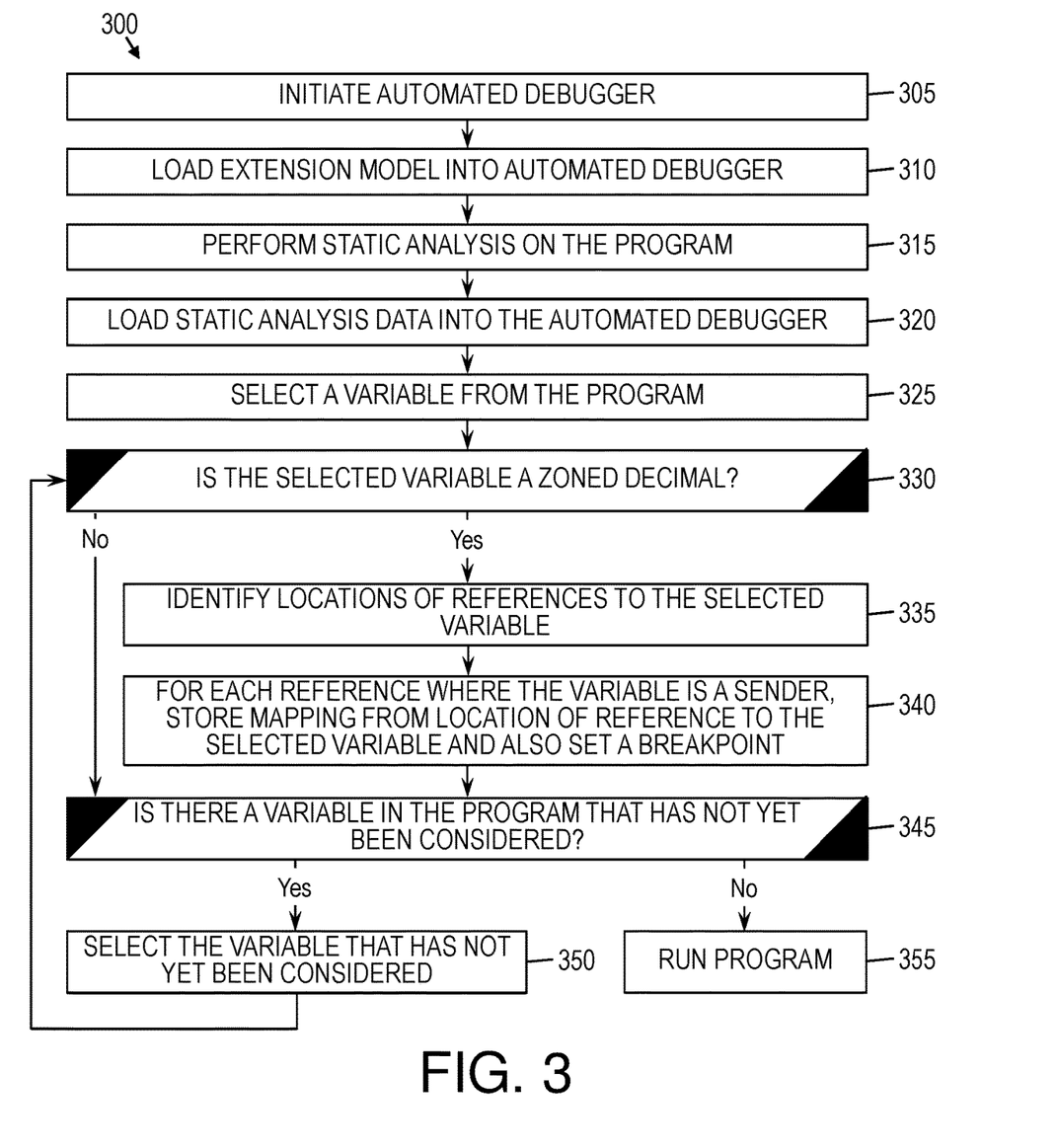
FIG. 3 is a flow diagram of a method for debugging a program, according to some embodiments of this invention.

FIG. 3 is a flow diagram of a method 300 for debugging a program 105, according to some embodiments of this invention. Some or all of the method 300 may be performed or managed by the automated debugger 110, which may be implemented through the debug script 150, such as the above.

As shown in FIG. 3, at block 305, the automated debugger 110 may be initiated to begin debugging of a program 105. This initiation may occur by various mechanisms. For example, and not by way of limitation, the automated debugger 110 may be a headless tool, which may be launched from a command line with the program 105 specified as input. For another example, the debugging system 100 may include a graphical user interface, from which the user may launch the automated debugger 110 to begin debugging the program 105. When the automated debugger 110 is launched, the automated debugger 110 may use the script debug engine 160 to interpret and execute the debug script 150.

At block 310, the automated debugger 110 may load the extension model 130, which may extend a variable type for the purpose of enabling one or more features on a variable of the debugging system 100. Specifically, for example, the extension model may extend the variable type to include a new operator, referred to herein as a "references" operator. When called with respect to a variable, the new operator retrieves, from previously gathered static analysis data (i.e., data gathered by static analysis), information about program references to the variable in question. After loading the extension model 130, the automated debugger 110 may then be capable of calling this operator with respect to a variable. For example, and not by way of limitation, the extension model 130 may be implemented in Extensible Markup Language (XML) and may include following or similar:

```
<debugExtensionModel type = "variable">
    <operator name = "references"/>
    <operator name = "type" isExisting = "true"/>
</debugExtensionModel>
```

At block 315, the debugging system 100 may perform static analysis on the program 105. This may be performed by the static analysis tool 140, which may be or include a tool known in the art, such as BEAM and lint. The static analysis tool 140 may parse one or more files of the program 105, including source code, for example, and may store the result of that parsing and associated analysis as static analysis data for later use. It will be understood that the blocks of this method 300 need not necessarily be performed in the order shown in FIG. 3, and in some embodiments of the invention, a compiler of the program 105 may act as the static analysis tool 140 and may generate the static analysis data.

The static analysis data determined by the static analysis tool 140 may vary based on design of the debugging system 100. In some embodiments of the invention, through parsing the one or more files of the program 105, the static analysis tool 140 may determine the type of each variable and the locations (e.g., line numbers) at which each variable is referenced. The static analysis tool 140 may also determine, for each reference of each variable, whether the variable is a sender or source (i.e., is read from) at that reference rather than being a receiver or destination (i.e., is written to). For example, and not by way of limitation, the static analysis data determined by the static analysis tool 140 may be written in XML and may include the following or similar:

```
<context scope = "global"> <!-- The context scope can also be a function
scope: scope="func1" or scope="module1/part1/func1" -->
    <variables>
        <variable name = "a1">
            <type>zoned decimal</type> <!-- The type of variable "a1"
is "zoned decimal", being determined from static analysis. -->
            <references>
                <sourceLocation file="f1.cbl" lines="100"
isSender="true"/> <!-- Variable "a1" is referenced from line 100 of f1.cbl,
as a sender. -->
                <sourceLocation file="f2.cbl" lines="125"
isSender="false"/> <!-- Variable "a1" is referenced from line 125 of
f2.cbl, as a receiver. -->
            </references>
        </variable>
    </variables>
</context>
```

At block 320, the automated debugger 110 may load the static analysis data, where the static analysis data is the result of performing static analysis on the program 105. After this loading, the static analysis data may be accessible to the automated debugger 110.

The debugging system 100 may set one or more breakpoints, based on the static analysis data. For example, as described in the above script for the automated debugger 110, this may include an iterative loop through the various variables in the program 105, as described below.

At block 325, a variable in the program 105 may be selected, where that selected variable had not yet been selected for consideration. To begin the loop, at decision block 330, it may be determined whether the selected variable is a zoned decimal, which is a variable type in the programming language COBOL, for example. If the variable is not a zoned decimal, then the method 300 may jump to decision block 355, which ends the loop for the selected variable. However, if the selected variable is a zoned decimal, then at block 335, the various locations of the references to the selected variable in the program 105 may be identified. In some embodiments of the invention, this identification utilizes the references operator established by the extension model 130. At block 340, for each reference where the variable is the sender (i.e., where the variable is read from), the automated debugger 110 may store a mapping from that location to the variable, and a breakpoint may be set at that location. It will be understood that blocks 335 through 340 of FIG. 3 may be implemented as an inner loop for each location at which the selected variable is referenced.

A breakpoint may be set at each referenced location in the inner loop for which the variable is a sender.

At decision block 345, it may be determined whether there is a variable in the program 105 that has not yet been selected for consideration in the above loop. If such a variable exists then at block 350, that variable may be selected, and the method 300 may return to decision block 330. If no such variable exists, then at block 355 the method 300 may exit from the loop and run the program 105. In some embodiments of the invention, when the program 105 is run, a runtime cycle is entered, and each breakpoint set at block 340 has a chance to be hit. The breakpoint handler 155 may provide a callback method, which may be called when a breakpoint is hit.

Figure 4:
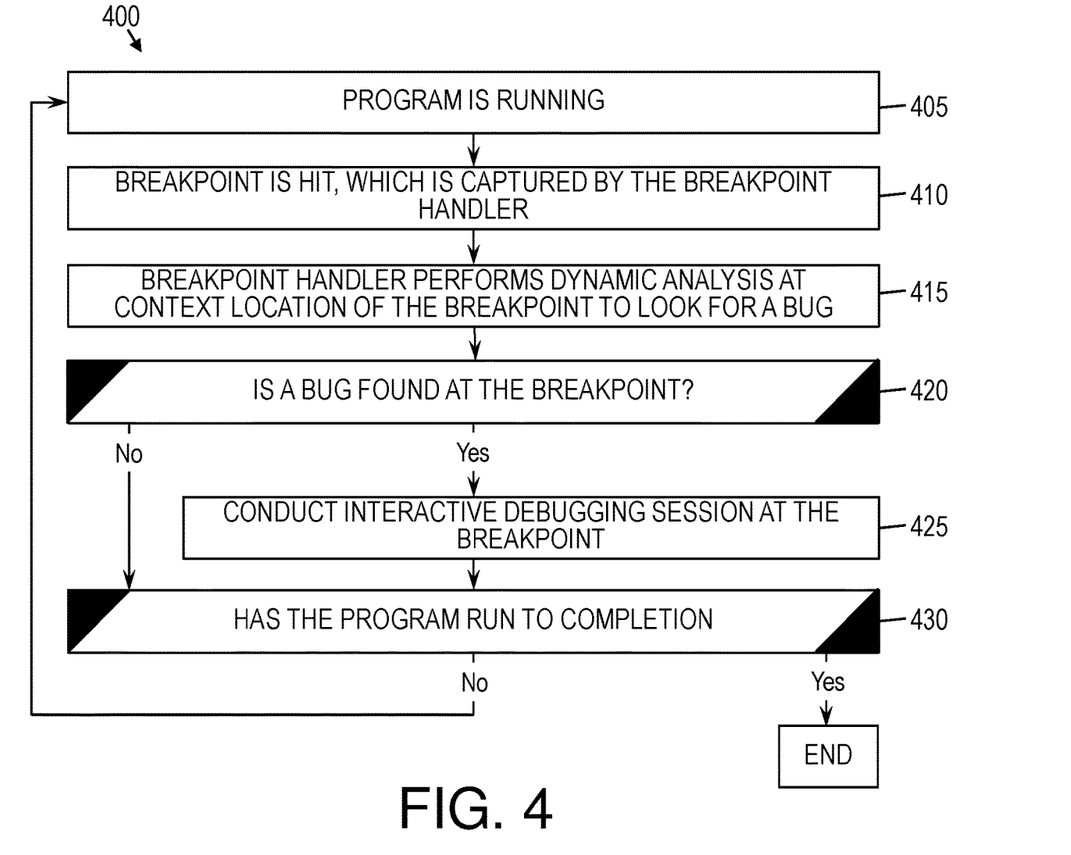
FIG. 4 is a flow diagram of a method of handling a breakpoint while debugging the program, according to some embodiments of this invention.

FIG. 4 is a flow diagram of a method 400 of handling a breakpoint while debugging the program 105, according to some embodiments of this invention. As shown in FIG. 4, at block 405, the program 105 is running through the automated debugger 110. At block 410, a breakpoint is hit, and that hit may be captured by the breakpoint handler 155.

At decision block 415, dynamic analysis may be performed at a context location of the breakpoint to determine whether a bug can be identified at the breakpoint. In some embodiments of the invention, the breakpoint handler 155 may check for one or more common runtime issues using dynamic analysis, but the breakpoint handler 155 may do so with the benefit of the static analysis data. The types of bugs that can be identified may be based on the design of the debugging system 100. In some embodiments of the invention, a validity check may be performed by the breakpoint handler 155 to identify bugs. For example, and not by way of limitation, when the program 105 is coded in COBOL, the breakpoint handler 155 may perform a validity check to determine whether variables that are zoned decimals meet certain predetermined criteria, such as matching one of the required bit patterns of a zoned decimal. While the failure to match one of these bit patterns would not conventionally be perceivable based on static analysis alone, this failure is a common runtime issue that can be identified by some embodiments of this invention. For additional examples, the breakpoint handler 155 may determine whether the variable associated with the breakpoint is a number that falls within a valid range, is a string containing only valid characters, or is a valid floating point number.

One of skill in the art will understand how to implement such a validity check. For example, and not by way of limitation, the following script or similar may be used to implement the breakpoint handler 150:

```
# Breakpoint handler
class MyBreakpointHandler(IBreakpointHandler):
    def run(self, context):
        global loc2vmap
        # Get the breakpoint location from the context
        loc = context.getLocation( )
        # Look up in the global map to find the variable that is referenced
        in this location
        v = loc2vmap[loc]
        # Perform zone check at the last step
        zoneCheck(v)
# Perform zone check for variable v
def zoneCheck(v):
    # SA info:
    if v.unsigned and (v.signLeading or v.signSeparate):
        return False
    normalByteStart = 0
    normalByteEnd = len(v.data)
    signByte = b'\x00'
    if not v.unsigned:
```

```
        if v.signLeading:
            signByte = ord(v.data[normalByteStart:normalByteStart + 1])
            normalByteStart += 1
        else:
            signByte = ord(v.data[normalByteEnd - 1:normalByteEnd])
            normalByteEnd -= 1
        if v.signSeparate and signByte != 0x4E and signByte != 0x60:
            return False
        if not v.signSeparate:
            signCode = signByte & 0xF0
            if signCode != 0xC0 and signCode != 0xD0:
                return False
        digit = signByte & 0x0F
        if digit > 0x09:
            return False
    for b in v.data[normalByteStart:normalByteEnd]:
        if b < 0xF0 or b > 0xF9:
            return False
    return True
```

While running the breakpoint handler 150 at decision block 420, if a bug is identified (e.g., if the zone check fails), then at block 425 the debugging system 100 may initiate, or launch, the interactive debugger 120 to conduct an interactive debugging session beginning at the location at which the bug was identified (i.e., the location of the breakpoint). To initiate the interactive debugging session, the debugging system 100 may suspend its automated debugging session and may connect to an integrated development environment (IDE) to establish an interactive debugging session of the interactive debugger 120. In some embodiments of the invention, the IDE may already be running, and thus the debugging system 100 need not be required to start the IDE but may simply connect to it.

When the interactive debugger 120 is remote from the automated debugger 110, as in FIG. 2, the connection to the IDE may be created through, for example, a debug daemon running on the client 220. The debugging system 100 may initiate a handshake with the IDE by connecting to the client 220 by way of a Transmission Control Protocol/Internet Protocol (TCP/IP) port on which the debug daemon is listening. When the connection is established, the debugging system 100 may send debug connection parameters to the client 220 to start the interactive debugging session. These parameters may include, for example, the location of the bug.

With the interactive debugger 120, a user can manually contribute to debugging the program 105. For example, and not by way of limitation, the user can examine the call stack and the values of related variables to understand the cause of the bug. If the interactive debugger 120 is not local, the automated debugger 110 and the client 220 may communicate using a debug communication protocol, such as, for example, the Execution and Program Data Control (EPDC) debug protocol. More specifically, the automated debugger 110 may behave as an EPDC forwarder between the host 210 and the interactive debugger 120. The automated debugger 110 may forward EPDC requests from the interactive debugger 120 to host 210 and may return EPDC replies from host 210 to the interactive debugger 120.

If the interactive debugger 120 is launched, then in some embodiments of the invention, the method 400 ends while the user interacts with the interactive debugger 120. Alternatively, however, the method 300 may proceed to decision block 430 after the interactive debugging session ends.

At decision block 430, the automated debugger 110 may determine whether the program 105 has run to completion. If program 105 has run to completion, then the automated debugger 110 may end debugging the program 150. If the program 150 has not yet run to completion, then the method 400 may return to block 405, where the automated debugger 110 may continue running the program 105 until another breakpoint is hit or until the program 105 runs to completion.

Figure 5:
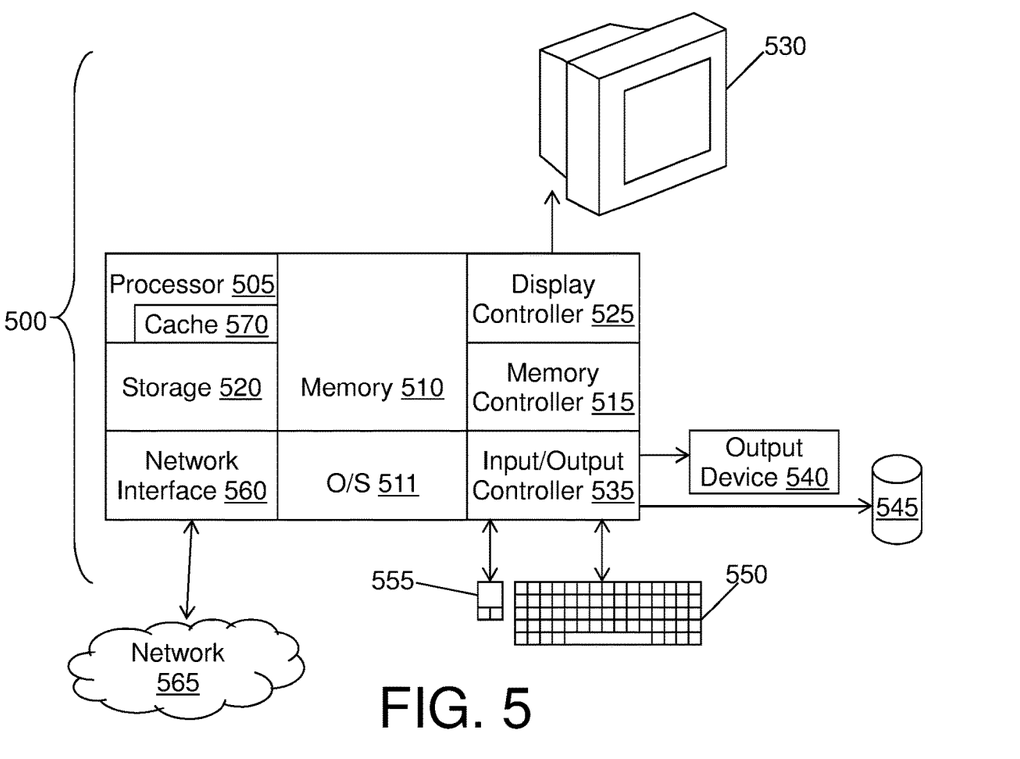
FIG. 5 is a block diagram of a computer system for implementing some or all aspects of the debugging system, according to some embodiments of this invention.

FIG. 5 illustrates a block diagram of a computer system 500 for use in implementing a debugging system 100 or method according to some embodiments. The debugging systems 100 and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid-state drive. The stored instructions in memory 510 or in storage 520 may include those enabling the processor to execute one or more aspects of the debugging systems 100 and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Debugging systems 100 and methods according to this disclosure may be embodied, in whole or in part, in computer program products or in computer systems 500, such as that illustrated in FIG. 5.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   generating static analysis data by performing static analysis on a program;
   setting automatically, by a computer processor, a breakpoint in the program based on the static analysis data by:
   selecting a variable,
   identifying a respective location of each reference to the variable in the program,
   extending a zoned decimal variable type to include a references operator based on the variable being a zoned decimal, wherein the references operator for the variable returns each referenced location of the variable in the program according to the static analysis data, and
   setting the breakpoint at the respective location of a selected reference to the variable in the program based on the zoned decimal variable type;
   hitting the breakpoint during a runtime of the program;

identifying automatically whether the zoned decimal matches a required bit pattern associated with the zoned decimal variable type at a context location of the breakpoint when the breakpoint is hit during the runtime of the program; and launching automatically an interactive debugging session of the program at the context location of the breakpoint, based on whether the zoned decimal matches the required bit pattern.

2. The computer-implemented method of claim 1, wherein the setting automatically the breakpoint further comprises, for the respective location of the selected reference to the variable in the program, determining that the variable does not comply with predetermined criteria.

3. The computer-implemented method of claim 2, wherein the determining that the variable does not comply with the predetermined criteria comprises determining that the variable fails a validity check.

4. The computer-implemented method of claim 1, wherein the generating the static analysis data by performing static analysis on the program comprises:
   parsing source code of the program;
   determining a respective variable type of each variable of a plurality of variables in the program, based on the parsing the source code of the program; and
   determining a respective location of each reference to each variable of the plurality of variables, based on the parsing the source code of the program.

5. The computer-implemented method of claim 1, wherein the interactive debugging session is managed by an interactive debugger that is located remotely, and further comprising communicating with the interactive debugger through Execution and Program Data Control (EPDC) debug protocol.

6. The computer-implemented method of claim 1, wherein the selecting the variable is only for zoned decimal variables.

7. A system comprising:
   a memory having computer-readable instructions; and
   one or more processors for executing the computer-readable instructions, the computer-readable instructions operable upon execution by the one or more processors to:
   generate static analysis data by performing static analysis on a program;
   set automatically a breakpoint in the program based on the static analysis data by:
      select a variable,
      identify a respective location of each reference to the variable in the program,
      extend a zoned decimal variable type to include a references operator based on the variable being a zoned decimal, wherein the references operator for the variable returns each referenced location of the variable in the program according to the static analysis data, and
      set the breakpoint at the respective location of a selected reference to the variable in the program based on the zoned decimal variable type;
   recognize an encounter with the breakpoint during a runtime of the program;
   identify automatically whether the zoned decimal matches a required bit pattern associated with the zoned decimal variable type at a context location of the breakpoint when the breakpoint in response to the encounter during the runtime of the program; and launch automatically an interactive debugging session of the program at the context location of the breakpoint, based on whether the zoned decimal matches the required bit pattern.

8. The system of claim 7, wherein the setting automatically the breakpoint further comprises, for the respective location of the selected reference to the variable in the program, determining that the variable does not comply with predetermined criteria.

9. The system of claim 8, wherein the determining that the variable does not comply with the predetermined criteria comprises determining that the variable fails a validity check.

10. The system of claim 7, wherein the generating the static analysis data by performing static analysis on the program comprises:
   parsing source code of the program;
   determining a respective variable type of each variable of a plurality of variables in the program, based on the parsing the source code of the program; and
   determining a respective location of each reference to each variable of the plurality of variables, based on the parsing the source code of the program.

11. The system of claim 7, wherein the interactive debugging session is managed by an interactive debugger that is located remotely, and further comprising communicating with the interactive debugger through Execution and Program Data Control (EPDC) debug protocol.

12. The system of claim 7, wherein the computer-readable instructions are further operable upon execution by the one or more processors to select the variable is only for zoned decimal variables.

13. A computer-program product for debugging a program, the computer-program product comprising a computer-readable storage medium having program instructions embodied therewith, the program instructions executable by a processor to cause the processor to perform a method comprising:
   generating static analysis data by performing static analysis on a program;
   setting automatically a breakpoint in the program based on the static analysis data by:
      selecting a variable,
      identifying a respective location of each reference to the variable in the program,
      extending a zoned decimal variable type to include a references operator based on the variable being a zoned decimal, wherein the references operator for the variable returns each referenced location of the variable in the program according to the static analysis data, and
      setting the breakpoint at the respective location of a selected reference to the variable in the program based on the zoned decimal variable type;
   hitting the breakpoint during a runtime of the program;
   identifying automatically whether the zoned decimal matches a required bit pattern associated with the zoned decimal variable type at a context location of the breakpoint when the breakpoint is hit during the runtime of the program; and
   launching automatically an interactive debugging session of the program at the context location of the breakpoint, based on whether the zoned decimal matches the required bit pattern.

14. The computer-program product of claim 13, wherein the setting automatically the breakpoint further comprises, for the respective location of the selected reference to the variable in the program, determining that the variable does not comply with predetermined criteria.

15. The computer-program product of claim 14, wherein the determining that the variable does not comply with the predetermined criteria comprises determining that the variable fails a validity check.

16. The computer-program product of claim 13, wherein the generating the static analysis data by performing static analysis on the program comprises:
   parsing source code of the program;
   determining a respective variable type of each variable of a plurality of variables in the program, based on the parsing the source code of the program; and
determining a respective location of each reference to each variable of the plurality of variables, based on the parsing the source code of the program.

17. The computer-program product for debugging a program of claim 13, wherein the selecting the variable is only for zoned decimal variables.

* * * * *